Inventors
John L. Defandorf
Russell R. Hackbarth
Anthony A. Kraus
Victor S. Sywulka By H R Rathers
Attorney July 7, 1964

J. L. DEFANDORF ETAL 3,140,426

SWITCHBOARD-TYPE OF CABINET FOR ELECTRICAL CONTROL APPARATUS

Original Filed Feb. 23, 1956

Inventors
John L. Defandorf
Russell R. Hackbarth
Anthony A. Kraus
Victor S. Sywulka By H R Rather
Attorney July 7, 1964 J. L. DEFANDORF ETAL 3,140,426
SWITCHBOARD-TYPE OF CABINET FOR ELECTRICAL CONTROL APPARATUS
Original Filed Feb. 23, 1956 4 Sheets-Sheet 4

Inventors
John L. Defandorf
Russell R. Hackbarth
Anthony A. Kraus
Victor S. Sywulka
By H.R. Rather
Attorney

# United States Patent Office 3,140,426
Patented July 7, 1964

3,140,426
SWITCHBOARD-TYPE OF CABINET FOR ELECTRICAL CONTROL APPARATUS
John L. Defandorf, 7116 N. Seneca Ave., Glendale 17, Wis.; Russell R. Hackbarth and Anthony A. Kraus, 315 N. 12th St., P.O. Box 463, Milwaukee 1, Wis.; and Victor S. Sywulka, Wauwatosa, Wis. (315 N. 12th St., P.O. Box 463, Milwaukee 1, Wis.)
Application Feb. 20, 1959, Ser. No. 794,767, now Patent No. 3,066,244, dated Nov. 27, 1962, which is a continuation of application Ser. No. 567,355, Feb. 23, 1956. Divided and this application June 14, 1961, Ser. No. 117,024
2 Claims. (Cl. 317—120)

This invention relates to a switchboard-type of cabinet for electrical control apparatus. This type of switchboard houses various motor control units and the like in a central location permitting control of remote equipment. These units may be readily adapted to any needs to provide a central control center which facilitates operation and maintenance while saving floor space. Devices of this class have been on the market for some time and the present invention is directed to improvements over prior constructions.

This application is a divisional application of the Defandorf et al. application, Serial No. 794,767, filed February 20, 1959, now Patent No. 3,066,244, issued November 27, 1962, which is a continuation of Defandorf et al. application Serial No. 567,355, filed February 23, 1956, and which is now abandoned.

One object of the present invention is to provide a horizontal wiring trough which simplifies wiring to the control units. The present trough has an open bottom which permits the vertical wires to be run through the trough where most desirable rather than only at the side walls.

Another object is to provide a simple mounting for the control units whereby complete access to the control may be had when removed from the control center.

Another object is to provide simple means for locking the control unit either on or off the line.

Still another object is to provide means for disconnecting the control unit from the front of the control center when the stab-on connectors may have become welded to the bus bars. In other control centers the entire center must be shut down and the connectors freed from the back of the center.

A further object is to provide a simplified support for the vertical bus bars.

A still further object is to provide a novel arrangement of the top of the control center to permit easier installation of and access to the wiring and bus structure at the top of the control center.

Other objects and advantages will be pointed out in, or be apparent from, the specification and claims, as will obvious modifications of the single embodiment shown in the drawings, in which:

Figure 1:
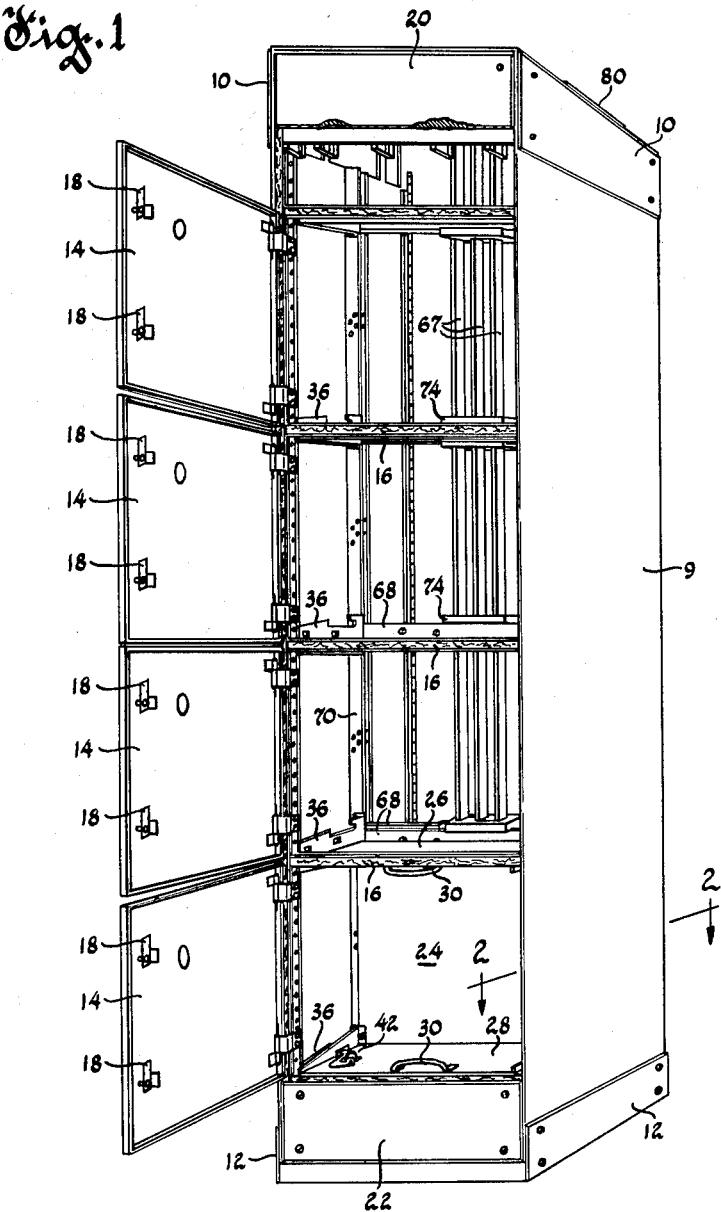
FIGURE 1 is a perspective of a control center section with the doors opened to show some of the interior construction and with a motor control mounting panel and its associated barrier plates mounted in the lower part of the section.

Referring now to the drawings in detail, FIG. 1 illustrates one control center section which is adapted to be used alone or in conjunction with additional sections placed in side-by-side relationship. When placed in side-by-side relationship, the adjacent top side plates 10 and the adjacent bottom side plates 12, attached to the main side frame plates 9—9 of like form, are removed as are the correspondingly adjacent plates on the respective sections to permit continuous runs of bus bars and of the horizontal wiring located either at the top or the bottom of the several sections. The section illustrated in FIG. 1 is shown, by way of example, as provided with four spaces for housing motor control units or the like with access to each space being had through an individual door 14 hinged at the left-hand edge of each of said spaces. If the motor control unit to be placed in a given section exceeds the vertical dimension of a single space of the vertical size shown, two or more vertical spaces may be employed for such purpose, with the thus enlarged space being similarly closed by a single door and the intermediate horizontal inverted channel braces 16 being removed to provide one continuous vertical opening to such enlarged space. The doors are shown (FIGS. 1 and 2) as being held closed by screw-operated latches 18. Access plates 20, 22 (FIG. 1) are provided at the top and bottom of the front of each vertical section to afford access to wiring and terminal boards located behind said plates.

The lower space of the control center section illustrated in FIG. 1 is fitted with a motor control unit mounting panel 24 shown here without any motor controls mounted thereon, since the particular controls have no bearing on the present invention. It will be understood, however, that the motor control unit is secured to panel 24, so that the top and bottom barrier plates 26, 28, respectively, bolted thereto (see FIG. 6) may be removed to afford access to the motor control on panel 24 from all four sides. The barrier plates 26, 28 preferably are of identical form, and are merely inverted, one with respect to the other, when mounting these plates on panel 24. Each barrier plate 26, 28 is provided with a handle 30 (FIGS. 1 and 2) to facilitate insertion and removal of each motor control unit assembly into its respectively corresponding space in the section.

When inserting the motor control unit in its space, the handles 30 are grasped so that the headed support pins 32 projecting from each side of the bottom barrier plate 28 will ride up the inclined surfaces 34 of the unit support brackets 36 until the support pins 32 drop into the respective horizontal track portions 38 (FIG. 4) of said support brackets. When the support pins 32 ride on the horizontal portions 38, the motor control unit will be supported by the pins 32 and by the forward portion of the bottom barrier plate 28 riding upon the upper surface of its associated inverted channel member 16. When the control unit assembly is pushed back all the way, the stab-on connectors, to be described hereinafter, are connected with the respective vertical bus bars. Conversely, while the assembly may be pulled forwardly until the pins 32 (FIGS. 2 and 6) contact the forward limit of the horizontal portions 38, in which position the stab-on contactors 56 are disconnected from the line and repairs may be made on the control unit.

Figure 2:
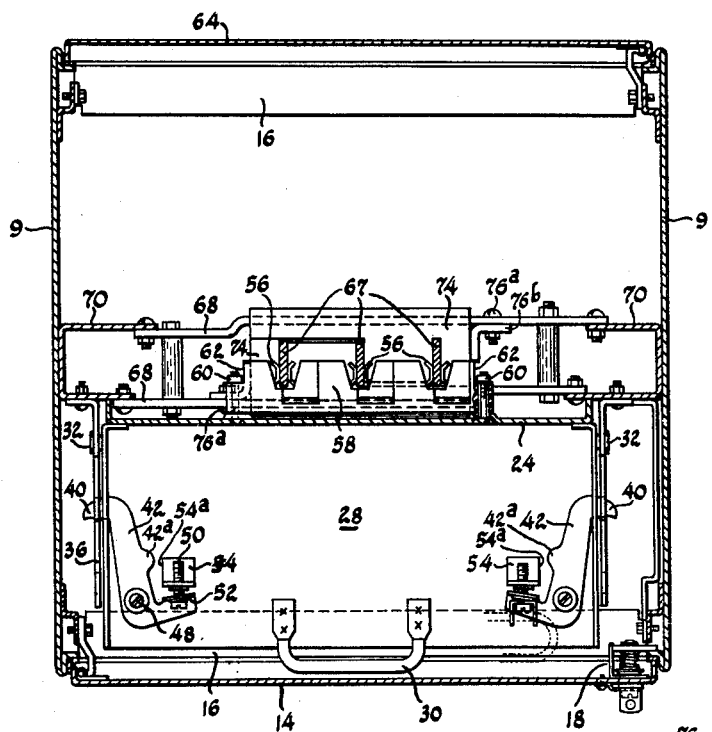
FIG. 2 is a horizontal sectional view, on the line 2—2 of FIG. 1, looking in the direction of the arrows.

The barrier plates 24 and 26 are provided with latches 42 for holding the control unit assembly in either on or off power position. When the control unit assembly is pushed all the way back so that the stab-on connectors 56 are connected to the vertical bus bars 67, the outwardly projecting dogs 40 of the crank-shaped latches 42 (FIGS. 2 and 6) are alined with the rearmost apertures 44 (FIGS. 2 and 4) in keepers 36 while the dogs 40 aline with the forward apertures 46 (FIG. 4) when the control unit assembly is disconnected from the line. The latches 42 are pivoted about pins 48 and are respectively actuated by screws 50 (FIGS. 2 and 6) rotatably clearing the upstanding ears 52 of latches 52, respectively, and each being threaded into a bracket 54 (FIGS. 2 and 6); so that by turning each screw 50 the corresponding crank 42 will be forced to move about its pivot 48. Thus each latch 42 may be actuated by means of a screw driver to project the dog 40 thereon into engagement with either the rear openings 44 or the forward openings 46 in the unit support brackets 36. It is to be understood that both barrier plates 26, 28 are preferably provided with such latches 42 at each side thereof so as to prevent any accidental tipping action which might connect a stab-on unit with the vertical buses when the unit is supposed to be off the line. As illustrated in FIG. 2, the rear edge of each latch 42 is provided with an integral pump or projection 42a, which is adapted to abut against the adjacent edge 54a of the base portion of bracket 54 to positively limit the degree of retraction movement of each latch 42 upon reverse movement of its associated screw 50.

Figure 6:
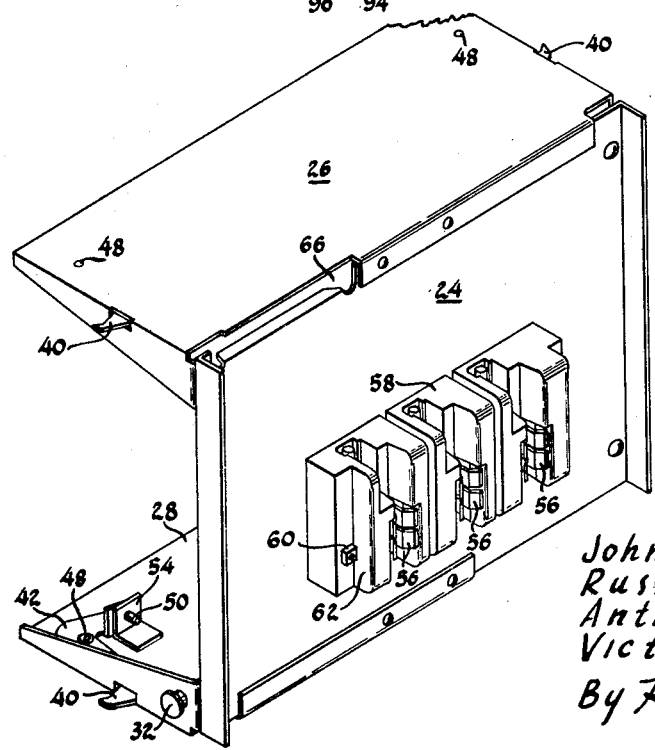
FIG. 6 is a perspective view from the rear of a motor control mounting panel and its associatel barrier plates.

FIGS. 2 and 6 show additional details of the stab-on connectors and the manner of mounting the same. The clip-type connectors 56 are each mounted in a molded insulating block 58, which is secured to the rear surface of its associated mounting panel 24 by means of two bolts passing from the front of the panel 24 through the insulating block 58 and threaded into the square nuts 60 (FIGS. 2 and 6). The square nuts are so related with respect to the adjacent outwardly projecting flat surface or shoulder 62 at each end of insulating block 58 that the nut will be restrained against rotation when the bolt is threaded thereinto. Alternatively, of course, the threaded nuts, or threaded bushings, might be molded into the corresponding ends of block 58. Therefore, the nut is positioned and the bolt is then threaded into the nut by turning from the front of the control panel. This is of importance since only the two bolts need be removed in order to disconnect the insulating block 58 and the stab-on connectors 56 from panel 24. Therefore, if one or more of the stab-on connectors 56 should become welded to the vertical buses, the present construction permits removal of the motor control from the control center by merely taking out the two bolts threaded into the square nuts 60. It will be appreciated that this permits removal of the motor control from the front of the control center rather than requiring access from the backside of the control center.

Although the drawings show the single vertical control housing section as having the hinged doors 64 at the rear portion thereof generally mounted so as to close the back of such section, it is to be understood that the present construction permits installation of motor control units from the rear of such section by merely duplicating the unit support and brackets, etc., in the rear portion of the control center. The horizontal and vertical buses are mounted in the middle of the control center and thus motor control units mounted from the back are completely practical and the unit can be so used when desired or required for a practical installation. It will be appreciated that the ability to remove the motor control units from the front even though the stab-on connectors have become welded to the vertical buses is particularly helpful in cases where motor control units are mounted in the rear. If control units are not mounted in the rear, the present structure can be placed against a wall to save floor space since rear access is no longer necessary.

In removing the motor control unit where the stab-on connectors have become welded, it will be appreciated that the wiring which leads from the insulating block 58 through the opening 66 (FIG. 6) between the barrier plate 26 and the control mounting plate or panel 24 would be disconnected at the front side of said panel 24 prior to removal of the control panel as a unit.

Figure 3:
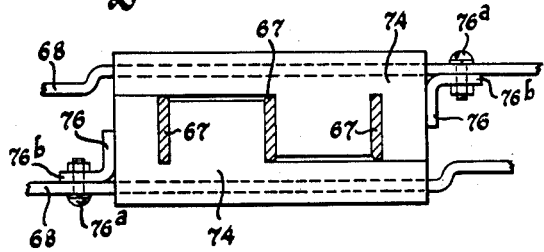
FIG. 3 is a fragmentary view showing the vertical bus supports.
Figure 3A:
FIG. 3a is a perspective view of one of the two like metal brackets employed to assist in retaining the bus supporting blocks in assembled relation.
Figure 4:
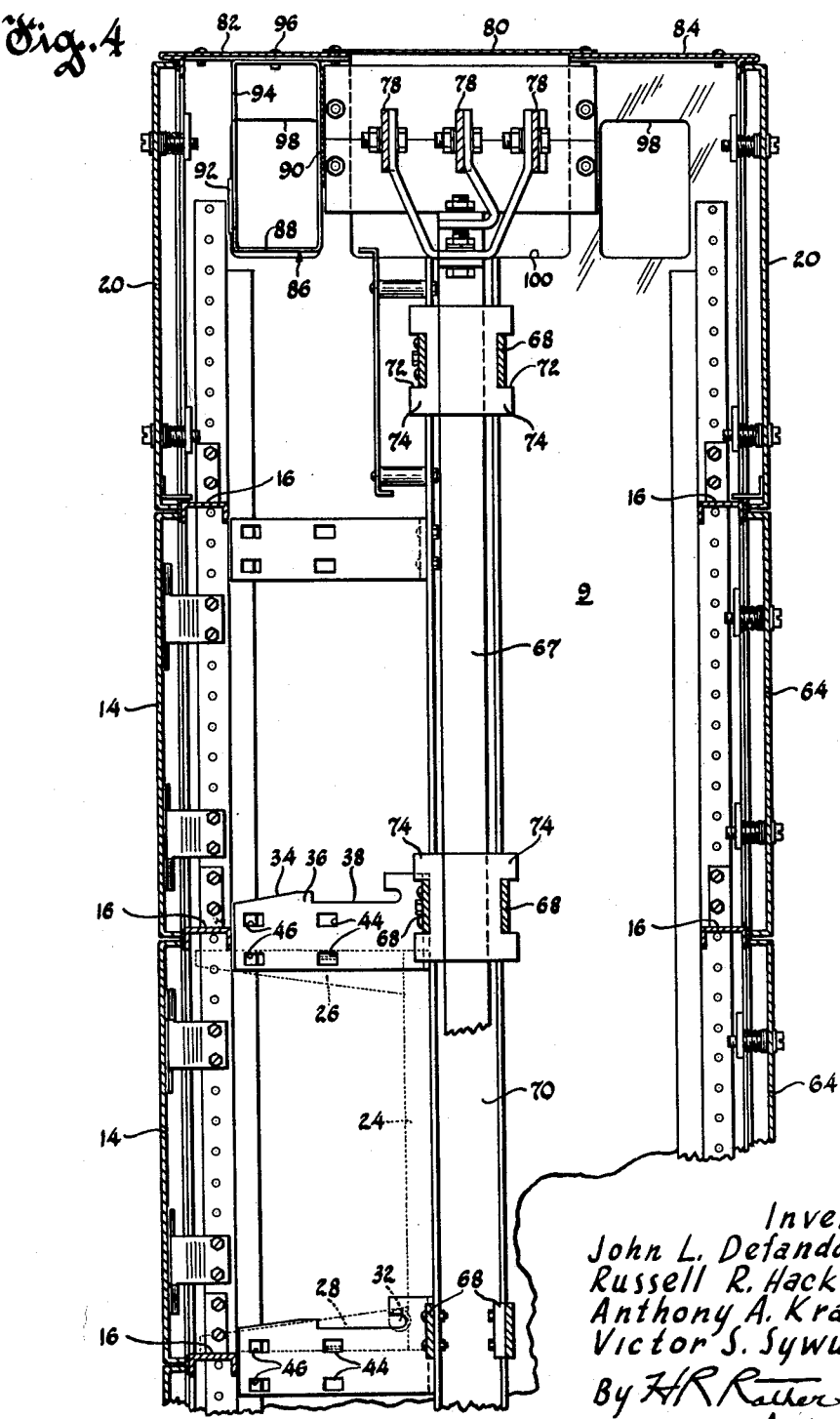
FIG. 4 is a vertical sectional view of an upper portion of a control center section constructed in accordance with the present invention.

FIGS. 2, 3 and 4 show the novel means for mounting the vertical bus bars 67. Straps 68, 68 of identical form are secured to the vertical channels 70 running along the respective side walls 9, 9 of each section and lie within the cooperating grooves 72 in the L-shaped insulating blocks 74 to hold the two blocks together, as seen most clearly in FIGS. 3 and 4. It will be noted that each insulating block 74 is generally L-shaped in plan and the blocks, when interfitted as shown in FIG. 3, jointly engage and hold the center bus bar 67 therebetween, while the two side bus bars 67 fit within suitable slots formed in said blocks 74, 74. A bracket 76 (FIGS. 2, 3 and 3a) is removably and adjustably secured to each strap 68 to prevent separation of the blocks, and to resist any strains in the blocks incident to expansive forces therein resulting from unusually heavy currents or the like. Therefore, this mounting employs pairs of identical straps 68 and insulating blocks 74 to hold the vertical buses in properly spaced position without requiring any direct connection by way of screws or the like to the insulating blocks. This manner of fabrication is extremely simple and highly effective and the number of parts required is kept to a minimum. Thus, as indicated in FIG. 3a, the threaded shanks of a pair of like bolts 76a, 76a (FIGS. 2 and 3) are inserted through closely fitting openings in the repective straps 68 (FIGS. 2 and 3), and the flat portion 76b of each bracket 76, having a pair of parallel, angularly extending slots therein, is fitted over the bolt shanks (see FIG. 3); whereupon the bracket 76 is pressed manually or otherwise into clamping engagement with the end of the insulating block 74 with which it is associated (see FIGS. 2 and 3); whereupon the nuts associated with the respective bolts 76a may be tightened to assist in retaining insulating blocks 74, 74 in properly assembled position.

Figure 5:
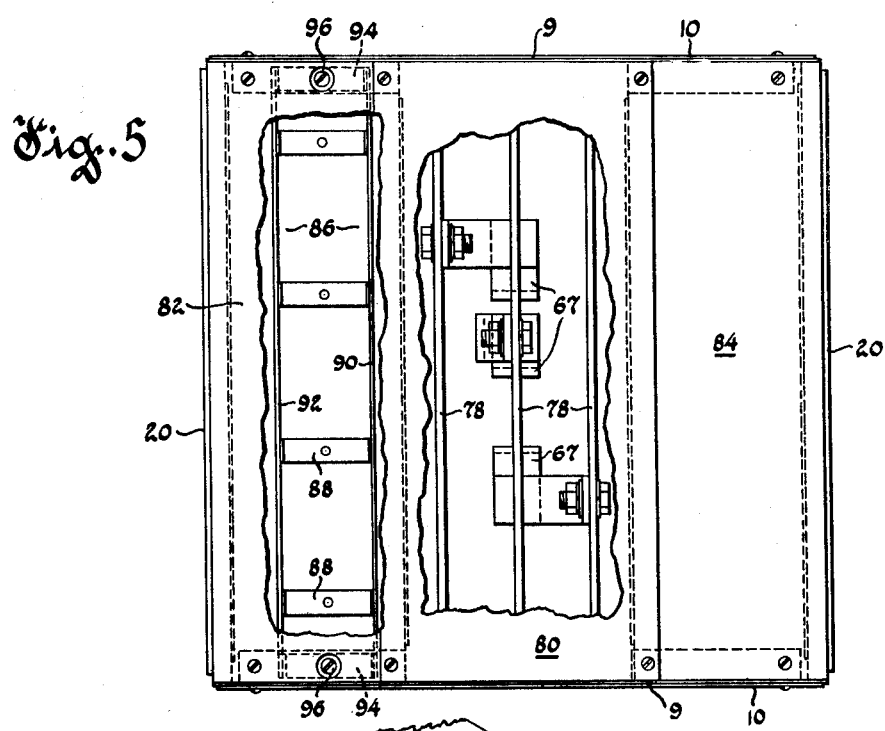
FIG. 5 is a top plan view, with parts broken away to show details of construction of the horizontal bus bars and a horizontal wiring trough.

As shown in FIGS. 4 and 5, the vertical bus bars 67 are connected to the horizontal bus bars 78 with the horizontal bars running along the middle of the control center section. Access to the horizontal bars 78 is facilitated by merely providing for removal of the top center plate 80 while the top front plate 82 and the top rear plate 84 remain in place. Similarly, the top front or rear plates 82, 84, respectively, may be removed independently of the middle plate 80. For example, the front plate 82 may be readily removed to afford access to the wiring in the horizontal wiring trough 86. The trough 86 preferably comprises a plurality of generally J-shaped brackets 88 spot welded to back pltae 90 and having a horizontal strap 92 running along the front upon which terminal boards or the like may be mounted. At each end of the trough 86 is an inverted J-shaped bracket 94 which is secured by bolts 96 to the top flange of the side frames 9—9. It will be noted in FIG. 4 that the top portion of the side of each section is provided with cut-out ports 98 in both the front and the back to aline with the horizontal wiring troughs when the sections are used in multiples. Similarly, port 100 is provided to permit use of interconnecting or one-piece horizontal bus bars running through several sections.

With the horizontal wiring trough construction shown, it will be appreciated that it is a simple matter to run wires down to various control units or terminal boards wherever most convenient rather than being required to run the wire to the end of the trough adjacent the side walls as is usual in other constructions. This not only makes the wiring job neater but permits saving wire. Furthermore, the open-type construction employed permits easier access to the wiring in the trough. This, coupled with the separate top plates permitting access to the front or rear trough or to the bus bars independently of the remainder of the system lends to considerable versatility in installation and maintenance. It will be appreciated that the wiring can be brought into the horizontal wiring trough either through the top plate 82 (or plate 84 in case a rear trough is used) or it may be brought in through the end plates.

Although only one embodiment of the present invention has been illustrated and described, it will be apparent to those skilled in the art that various changes and modifications may be made therein without departing from the spirit of the invention or the scope of the appended claims.

We claim:

1. Control apparatus comprising a vertically standing control center section including spaces adapted to receive control units, vertical bus bars mounted in the section, a control unit panel adapted to fit in a space in a vertical position, connectors on the rear of the panel and adapted for connection to the vertical buses in an on-power position and to be operated from the buses in an off-power position, horizontal barrier plates connected to the top and bottom edges of said panel and projecting forwardly therefrom, support means comprising a unit support bracket positioned adjacent each side of the lower barrier plate, a support pin projecting from the rear portion of each side of the barrier plate and resting on the upper edge of the unit support brackets to support the rear portion of the panel and barrier plate assembly, the forward portion of each unit support bracket having an inclined portion, said pins being slidable upon the inclined portion, the rearward portion of each unit support bracket having a depressed horizontal portion onto which the pins drop when inserting the assembly into the space, the depressed portion having a length sufficient to define the on- and off-power positions in cooperation with said pins and locking means including a latch carried by the lower barrier plate and engageable with one of the unit support brackets in either of said positions for locking the control unit in either of such positions.

2. Control apparatus according to claim 1 wherein said locking means includes screw operated means for actuating the latch into or out of engagement with said unit support bracket.

References Cited in the file of this patent

UNITED STATES PATENTS

| | | |
|---|---|---|
| 2,542,853 | Wills | Feb. 20, 1951 |
| 2,711,452 | Spencer et al. | June 21, 1955 |
| 2,719,251 | Stewart | Sept. 27, 1955 |
| 2,762,878 | Wills | Sept. 11, 1956 |
| 2,997,629 | Wolski | Aug. 22, 1961 |

FOREIGN PATENTS

| | | |
|---|---|---|
| 323,657 | Great Britain | Jan. 9, 1930 |

UNITED STATES PATENT OFFICE
CERTIFICATE OF CORRECTION

Patent No. 3,140,426                                        July 7, 1964

John L. Defandorf et al.

It is hereby certified that error appears in the above numbered patent requiring correction and that the said Letters Patent should read as corrected below.

In the grant, lines 1 to 3, for "John L. Defandorf, of Glendale, Wisconsin; Russell R. Hackbarth and Anthony A. Kraus, of Milwaukee, Wisconsin; and Victor S. Sywulka, of Wauwatosa, Wisconsin," read -- John L. Defandorf, of Glendale, Wisconsin; Russell R. Hackbarth and Anthony A. Kraus, of Milwaukee, Wisconsin; and Victor S. Sywulka, of Wauwatosa, Wisconsin, assignors to Cutler-Hammer, Inc., of Milwaukee, Wisconsin, a corporation of Delaware, --; lines 12 and 13, for "John L. Defandorf, Russell R. Hackbarth, Anthony A. Kraus, and Victor S. Sywulka, their heirs" read -- Cutler-Hammer, Inc., its successors --; in the heading to the specification, lines 4 to 8, for "John L. Defandorf, 7116 N. Seneca Ave., Glendale 17, Wis.; Russell R. Hackbarth and Anthony A. Kraus, 315 N. 12th St., P. O. Box 463, Milwaukee 1, Wis.; and Victor S. Sywulka, Wauwatosa, Wis. (315 N. 12th St., P. O. Box 463, Milwaukee 1, Wis.)" read -- John L. Defandorf, Glendale, Wis.; Russell R. Hackbarth and Anthony A. Kraus, Milwaukee, Wis.; and Victor S. Sywulka, Wauwatosa, Wis., assignors to Cutler-Hammer, Inc., Milwaukee, Wis., a corporation of Delaware --.

Signed and sealed this 10th day of November 1964.

(SEAL)
Attest:

ERNEST W. SWIDER
Attesting Officer

EDWARD J. BRENNER
                                           Commissioner of Patents